Oct. 2, 1962
D. PINDZOLA ETAL
3,056,247
AIR FILTER
Filed March 26, 1959
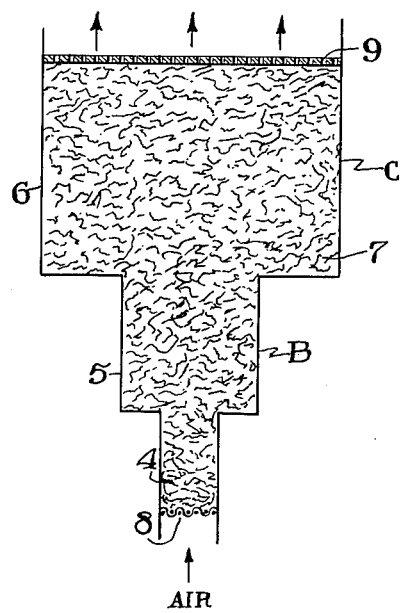
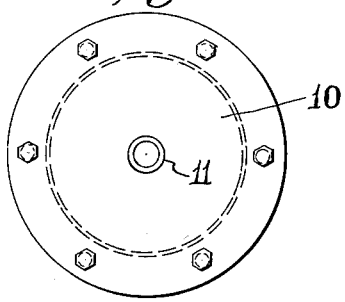
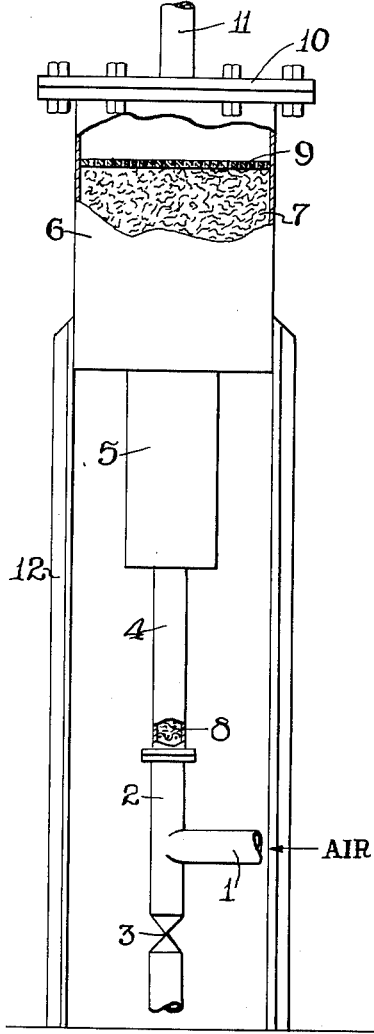
INVENTORS
Daniel Pindzola,
Walter Nazarewicz,
Samuel C. Beesch
BY Connolly and Hutz
ATTORNEYS

United States Patent Office 3,056,247
Patented Oct. 2, 1962

3,056,247
AIR FILTER
Daniel Pindzola, Brooklyn, Walter Nazarewicz, Woodside, and Samuel C. Beesch, Wantaugh, N.Y., assignors to Chas. Pfizer & Co., Inc., New York, N.Y., a corporation of Delaware
Filed Mar. 26, 1959, Ser. No. 802,186
6 Claims. (Cl. 55—97)

This application is a continuation-in-part of my copending application for "Air Filter" filed June 6, 1957, and bearing Serial No. 664,106, now abandoned. This invention relates to a gas filter, and more particularly, to an improved filter and method for producing sterile air suitable for fermentation purposes and the like.

In order to carry out aerobic fermentations on a large scale, deep-tank fermentation is used in many processes. The growth of submerged microorganisms is sustained and accelerated by passing sterile air through the nutrient media or fermentation broth. Turbulent agitation resulting from the bubbling air stream increases oxygen and nutrient transfer to the organisms, and removes cell waste products.

In producing air for such fermentations, sterility is a criterion which has to be attained. Some fermentations may be capable of resisting contamination, either entirely or at particular phases of the process cycle, due to pH or the presence of certain substances, such as antibiotics. However, to assure adequate process control where the same source of air is to be employed in a variety of fermentations, sterile air is an absolue necessity. While an efficiency of 100% is a rarely attainable design specification, an air sterilization system must operate with this efficiency to be considered completely acceptable. Even the presence of one contaminant microorganism in a tank could result in a product loss or destruction because of phenomenal growth rates of contaminants.

Atmospheric air, used as a raw material for fermenter aeration, contains inanimate matter as well as living microorganisms which possibly could affect a fermentation process. Such factors as carbon dioxide variation or the presence of sulfur dioxide might have important effects on specific fermentations but ordinarily are not variables which are controlled in industrial fermentations. Inanimate matter such as dusts and liquid aerosols are also not given much consideration. In all probability the risk of interference by these materials as normally present is small. Ordinary city air contains on the average 14 mg. of solids per 1,000 cubic feet of air, amounting to 5 to 30 million individual particles. The median particle diameter is approximately 0.5 micron with very few particles in excess of 1.5 microns. Although dust in itself probably has no effect on fermentations, many microorganisms are attached to dust particles, thereby posing a contamination problem when such particles are removed.

In contrast to the large number of dust particles in air, the microorganism counts appear small. An average of 85–250 microorganisms per cubic foot of air has been suggested by one investigator for air in a metropolitan area. However, it is recognized that this average count is subject to considerable variation due to seasonal and climatic variations. The source of the organisms is also likely to affect the number present, as well as the type of organism present. It has been observed that the air in the vicinity of a plant engaged in varied fermentations is abundantly laden with a variety and high concentration of microorganisms, as much as 1100 microorganisms per cubic foot.

An effective air sterilization system must be capable of removing or destroying all types of microorganisms possessing a wide range of sizes. Bacteria and molds may range from a few tenths to 25 microns in size, the commonest size being 1–5 microns. Viruses and bacteriophages are as small as a few hundreths of a micron and possibly smaller. The microorganisms may occur singly, grouped or attached to solid particles in the air.

Numerous methods for producing sterile air have been considered or actually used commercially. Other methods and devices, which although not used for air sterilization directly, have been evaluated in the fields of air conditioning, air pollution control, and industrial process dust recovery. The methods which have been employed fall essentially into two categories, i.e. those which function by destruction of the microorganisms, as by heat, radiation and disinfection; and those which involve collection of the microorganisms, as by ordinary filtration, electrostatic filtration, ultrasonic precipitation, scrubbing and thermal precipitation.

Although heat sterilization has been used commercially, the high temperatures and large heat exchangers necessary render it expensive and impractical in comparison to other means available. Operating and maintenance costs are likewise high in comparison, since they involve fuel, cooling water, and furnace and heat exchanger maintenance.

Likewise, sterilization with heat of compression is impractical in operation, since compression is an inefficient and expensive manner of generating heat.

While both high energy electromagnetic and particulate radiations have the ability to sterilize microorganisms, the only widely developed and economical radiation source has been ultraviolet light. However, the use of UV lights for sterilizing fermenter air is impractical, since it would involve unusually large units, and some microorganisms, such as certain spore forming bacteria and molds, are resistant to ultra-violet light. Application of disinfectants to the sterilization of fermenter air has not been successful, due to incomplete sterilization and carry-over of harmful disinfectants to the fermentation medium.

Methods of collecting or removing particles from air have been extensively developed in the fields of air conditioning, air pollution control and process dust recovery. Electrostatic precipitators are excellent for such uses as dust recovery and smoke control, where large volumes of uncompressed air are to be cleaned, but the equipment required is much too large and expensive for practical air sterilization. Ultrasonic precipitation is also quite useful for smoke and dust control, but it is not an efficient enough method for effective sterilization of air. The development of air sterilizers using a scrubbing mechanism does not appear to be promising, in view of the fact that highly efficient secondary collection devices are required. In addition, thermal precipitation, while effective, involves the use of highly expensive equipment.

Accordingly, it is an object of this invention to provide an improved filter which is capable of producing complete removal of foreign particles from a gas such as air.

Another object is to provide a filter which is capable of producing complete and effective sterilization of air.

Still another object is to provide a filter of the character described at a minimum of initial cost and maintenance expense.

A further object is to provide a unique method of air sterilization which is free of the disadvantages which attend other methods of sterilization.

These and other objects are accomplished by the present invention which may best be understood by reference to the accompanying drawings and the descriptive matter relating thereto. In the drawings:

FIG. 1 is a schematic view of a filter, illustrating the principles employed in accordance with this invention; and FIG. 2 is an elevation, partially broken away in cross section, of one embodiment of the invention; and FIG. 3 is a top plan view of the filter of FIG. 2.

In accordance with this invention, a filter is so designed and constructed as to embody the following collection mechanisms for removing microorganism and/or small particles from the air:

(1) Inertial impingement
(2) Electrical attraction
(3) Diffusional deposition
(4) Settling
(5) Direct interception
(6) Sieving
(7) Eddy currents (1) *Inertial impingement.*—Particles in an air stream tend to follow the streamlines around a fiber, but may be thrown out of the stream onto a fiber by inertial forces. In general, collection efficiency is increased directly by increasing the air velocity and by decreasing fiber diameter in the filter medium.

(2) *Electrical attraction.*—Small particles in an air stream can be attracted to a fiber by either electrostatic or induced electrical force. Electrostatic forces are commonly developed by frictional contact between particles or by attachment of ions in the air to a particle's surface. Induced forces of attraction develop by a transference of electrons along the surface or within a particle.

(3) *Diffusional deposition.*—This mechanism is recognized as being of considerable importance in the collection of particles under one micron in diameter. Filter breakthrough decreases as air velocity decreases when small particles (below 0.2 micron) are the filtered aerosol. Brownian motion of small particles is caused by the collision of air molecules with the particles. The probability of a particle colliding with a fiber is therefore increased.

(4) *Settling.*—This mechanism, sometimes referred to as "Stoke's Deposition", functions in every fiber bed filter. It is of particular interest that settling is not influenced by the direction of flow through a filter. The distance through which particles must settle is relatively short in a tightly packed bed of fibers. Regardless of the flow direction, the settling force assists the particles in depositing on the fiber tops. Decreased air velocity is the only major controllable variable which can increase this effect. In general, particles of large diameter may be collected by this mechanism.

(5) *Direct interception.*—Direct interception is a mechanism which is predominantly of importance for larger sized particles. The method of action can be seen by visualizing a particle of radius $r$ traveling on the center of a stream line. If the stream line comes within a distance $r$ of a fiber, particle and fiber contact and adhere, regardless of the stream velocity. Small fibers will increase the collection effect by this mechanism.

(6) *Sieving.*—Although this mechanism may not be considered of great importance in fiber bed filters, it may nevertheless be used to advantage. Tightly packed fibers may cross each other forming openings smaller than the aerosol particles. High flow resistance through these smaller passages is a factor limiting collection. If air velocity is high the flow resistance effect is reduced and collection efficiency will be greater. Another variable which will increase collection by this mechanism is a high packing density. In general, this mechanism functions for removing particles larger than one micron.

(7) *Eddy currents.*—Although the importance of this mechanism has not been determined by any investigator, it is recognized that a turbulent back-wash occurs in a stream behind an obstruction. Material in the stream is collected and held in these eddies. Aerosols or microorganisms which are collected in a swirling eddy have an increased chance of contacting and adhering to the backs of fibers.

It has been found that velocity significantly influences the major collection mechanism; some mechanisms favoring high velocity, some low velocity. Analysis also shows that the size of particle which is being collected is also dependant upon velocity; low velocity favoring small particle collection, in general, and high velocity favoring large particle collection. Despite this, ordinary filters are generally so designed as to maintain a substantially constant velocity based upon some mean particle size, with the result that optimum filtration is not achieved. The relation between velocity and particle size, with respect to the aforesaid collection mechanisms is outlined in the following table:

TABLE I

| Mechanism | Velocity Favoring Mechanism | Particle Size Favored |
| --- | --- | --- |
| 1. Inertial Impingement | H | l. |
| 2. Electrostatic Collection | L | s (l, to some extent). |
| 3. Diffusion | L | s. |
| 4. Settling | L | l. |
| 5. Direct Interception | H or L | l (s, to some extent). |
| 6. Sieving | H | l. |
| 7. Eddy Currents | H or L | l or s. |

H—high velocity.
L—low velocity.
l—large particles, (i.e. above 0.3µ)
s—small particles, (i.e. below 0.3µ).

In order to effect complete sterilization of a gas such as air by removal of both large and small particles, this invention provides a filter which establishes an abrupt decrease in velocity between its inlet and discharge ends. A general manner in which this may be accomplished is illustrated schematically in FIG. 1. Unsterile air, passing through zone A at a high velocity, is filtered free of "large" microorganisms (plus any "smaller" microorganisms which may be attached to other particles) by the inertial mechanism. Sieving and direct interception of the "larger" microorganisms also occurs in this zone. While passing through zone A, electrostatic charges are built up on the microorganisms; frictional contacting between air, fibers and microorganisms is intensified at a high velocity, causing charge build-up.

As the air passes into zone B, the velocity decreases. Direct interception of "larger" microorganisms continues. In addition, eddy collection occurs behind fibers in this zone. Moreover, electrostatic collection begins here, enhanced by charges built up in zone A.

As zone C is entered, the velocity decreases again, allowing the settling mechanisms to collect any "larger" microorganisms, if any have slipped through the preceding zones. The low velocity in zone C enables collection, by diffusion and electrostatics, of "small" microorganisms (i.e. viruses, phages, etc.) which have not previously been collected.

Although the foregoing explanation generally describes some of the phenomena which occur within the filter of the present invention, it is particularly surprising that the mere provision of a smooth or uniform increase in filter cross section in the direction of air flow does not suffice. Thus, for example, it has been found that a filter of simple conical shape has little or no advantage over conventional filters. To accomplish the objectives of this invention, it is necessary to provide at least one abrupt increase in filter cross section along the path of air flow. The exact reason why a velocity gradient created by such abrupt increase unexpectedly accomplishes complete sterilization of air is not known. Nevertheless, it has been found that passing air through a filter having successive cross-sectional areas which abruptly increase at least once therewithin provides this remarkable result.

To establish the required abrupt decrease in velocity between the inlet and discharge ends of the filter of the present invention, the ratio of inlet to outlet cross-sectional areas may range from about 1:10 to about 1:150, and preferably from 1:15 to 1:100. The design of such a filter may embody a variety of configurations. Thus, for example, the filter may have a stepped configuration of cylindrical or rectangular cross section. The stages may be positioned one above the other, as illustrated, or they may be positioned beside one another, connected in tandem by one or more conduits. While it is preferred that the filter and/or the various stages thereof be vertically positioned, under some circumstances horizontal positioning may successfully be employed.

An illustrative embodiment of the invention is set forth in FIGS. 2 and 3, which show a filter having a stepped cylindrical configuration. Air is introduced through an inlet 1 in an upstanding pipe 2, provided with a blow out valve 3 for removing any water which condenses at the inlet, or in the filter. The filter itself consists of three sections, 4, 5 and 6 respectively, of pipe or other suitable material of cylindrical cross-section forming three stages. Each of these stages is packed with a filter medium 7, preferably glass wool, such as Fiberglas, or other suitable fibrous material. This material is retained within the filter by a screen 8 at the base of the first stage, 4, and a perforated plate 9 at the top of the third stage, 6. The top of the third stage is provided with a plate 10 and outlet pipe 11 to enclose the filter and provide a discharge therefor. All joints are preferably hermetically sealed against possible contamination. The entire filter is supported on three legs 12 which are secured to the third stage 6 by welding or other suitable means.

It should be apparent from the above description that the filter should be provided with at least one abrupt increase in cross-sectional area along the general path of gas flow in order to cause the desired abrupt decrease in velocity between its inlet and discharge ends. The length or depth of the filter may vary considerably, depending upon many factors, such as cross-sectional area, density of the medium, and intake velocity. However, for most purposes it has been found that a total depth of from about 1 to 4 feet is adequate.

In operating the filter of FIGS. 2 and 3, air is introduced at a linear or superficial velocity ranging from about 1 to 15 feet per second. The specified ratios of inlet to outlet cross-sectional areas, i.e. ratios of from 1:10 to 1:150, thereupon provide a velocity gradient of from about 0.9 to 14.9 feet per second across the filter. For example, if air in introduced at 10 feet per second to a filter having a 1:100 inlet:outlet section area ratio, the air velocity in the final filter section is 0.1 foot per second and a gradient of 9.9 feet per second is established. It should be understood that the term "linear velocity" wherever employed herein is superficial velocity, defined to mean the velocity calculated by dividing the rate of air flow, expressed in cubic feet per second as measured at 70° F. and 14.7 pounds per square inch, by the cross-sectional area of the empty filter vessel, expressed in square feet. Furthermore, the values for velocity gradient represent the difference between the linear or superficial velocities in the terminal sections of the filter vessel.

A wide variety of materials may be employed as the filter medium in accordance with this invention. Thus, fibrous materials such as glass wool, waste textile products, cellulose fibers, natural and synthetic resinous fibers, and granular material such as carbon, glass, clay, ceramic beadlets, silica and the like, may all be employed. However, fibrous materials which are capable of steam, heat or chemical sterilization without disintegration are preferred for optimum filter efficiency.

Glass fibers have been found to be particularly advantageous, since they are both durable and develop a positive charge when subjected to frictional contact with foreign particles in the air. The latter facilitates electrostatic collection, since most microorganisms in the air develop negative charges.

The size of the glass fiber may vary from about 5 to 40 microns in diameter, a diameter of from about 10 to 30 microns being the optimum for high efficiency filtration in accordance with this invention. In general, the smaller the fiber, the greater the filter efficiency. However, as the size of the fiber is decreased, breakage becomes a problem. For this reason, it is advantageous to employ a borosilicate glass fiber which has been found to be highly resistant to breakage, and resistant to deterioration upon sterilization with steam. Such fibers are also more resistant to matting, which is generally caused by excessive breakage.

The fibrous material is packed within the filter as tightly as possible, ordinarily to a bulk density of at least 10 pounds per cubic foot. While excellent results are achieved with glass wool packed to a density of 10 to 12 pounds per cubic foot, it has been found that even better results may be obtained at higher packing densities, ranging up to 50 or even 100 pounds per cubic foot. Such densities are conveniently achieved by cutting the glass fibers to shorter lengths. For example, glass fiber of about 30 micron diameter may be chopped to one-inch lengths and packed to a density of about 40 pounds per cubic foot to provide a filter of superior effectiveness. Packing densities materially above 100 pounds of glass fiber per cubic foot may result in excessive pressure drop across the filter and will ordinarily be avoided.

The following illustrative examples are provided to further describe the extraordinary advantages in capacity and effectiveness achieved by the novel filters of the present invention under extremely adverse conditions.

*Example I*

A filter vessel, designated F–1 and constructed in accordance with FIG. 1, has a stepped cylindrical configuration defining three sections: an inlet section A 3 inches in diameter, an intermediate section B 5¾ inches in diameter, and an outlet section C 11⅝ inches in diameter. Each section is 8½ inches high. This vessel is packed with 8 pounds of glass wool having a fiber diameter of about 30 microns. The packing density is about 11.5 pounds per cubic foot in each section.

A second filter vessel, designated F–2, comprises a hollow cylinder 7½ inches in diameter and 26.8 inches high. This vessel is also packed with 8 pounds of glass wool, at a packing density of about 11.5 pounds per cubic foot. After packing F–1 and F–2 are sterilized for about one hour with steam at 70 pounds per square inch gauge pressure.

For test purposes, air is supplied to the filters by a compressor through a common manifold. At a point between compressor and manifold a broth containing a microorganism, *Serratia marcescens*, is continuously atomized into the air stream. This organism, commonly found in air and soil, is selected because, when grown on agar, it produces red colonies which are readily detected. Broth is metered into the air stream at a uniform rate, so as to supply 6 billion microorganisms per hour to the inlet of each filter.

The air rate to each filter is set at 200 cubic feet per hour as measured at 70° F. and 14.7 pounds per square inch pressure, corresponding to a linear velocity of 0.18 ft./sec. through F–2 and velocities of 1.13, 0.31 and 0.075 ft./sec. through the inlet, intermediate and outlet sections, respectively, of F–1.

Air is passed continuously through the two filters for a period of 77 hours. At intervals a sterile filter paper approximately 3 inches in diameter is interposed in the discharge line of each air filter, so that all discharged air passes through the paper for 30 minutes. Each paper is then removed and placed on a sterile agar plate face down for 30 minutes and then removed. Agar plates are incubated at 28° C. for 48 hours and then examined.

When the foregoing procedure is followed, the cultures obtained from the air discharged from F–2 reveal the presence of *S. marcescens* within 5 hours of the beginning of the test, and the organism continues to break through the filter throughout the test period. The culture obtained from air discharged from F–2 after 29 hours' operation contains 1920 colonies of the microorganism. No organisms are detected in the air discharged from F–1 at any time during the 77 hours of operation.

*Example II*

The filters are steam-sterilized and the procedure of Example I is repeated under substantially the same conditions in a test of 264 hours' duration. Microorganisms again break through F–2 within 5 hours, while the discharge from F–1 contains no detectable organisms at any time during the test. At the conclusion of the test the glass wool in each filter vessel is examined and removed. In each case the glass wool remains tightly packed against the wall and shows no sign of center channeling.

*Example III*

A conical filter, 26 inches high and tapering from a diameter of 3.07 inches at the inlet to 11½ inches at the discharge, is connected to the inlet manifold in parallel with F–1 and F–2. This vessel, designated F–3, is packed with 8 pounds of glass wool to a density of about 11.5 pounds per cubic foot, and F–1 and F–2 are similarly packed.

Air is supplied to each sterilized filter at the rate of 490 cubic feet per hour, corresponding, in the case of F–1, to linear velocities of 2.65, 0.756 and 0.185 ft./sec. in the inlet, intermediate and discharge sections, respectively, in the case of F–2, to a linear velocity of 0.44 ft./sec.; and in the case of F–3, to velocities of 2.65 and 0.189 ft./sec. at the inlet and discharge points, respectively.

Broth containing *S. marcescens* is continuously atomized into the inlet air at a rate corresponding to 1.9 trillion microorganisms per filter per hour. Throughout a test period lasting 127 hours no microorganisms are detected in the air discharged from F–1, whereas they appear within 6 hours in the air discharged from F–2 and F–3.

*Example IV*

A filter vessel, constructed in accordance with FIG. 1, has an inlet A section 1 inch in diameter, and intermediate B section 3 inches in diameter, and an outlet C section 10 inches in diameter, each section being 10 inches high. It is packed with glass wool chopped to one-inch lengths to a density af about 45 pounds per cubic foot. This filter is operated at a superficial air velocity of about 10 feet per second in the inlet A section and exhibits a marked superiority to conventional filters in removing microorganisms from air.

What is claimed is:

1. An improved filter for removing foreign particles from a gas, comprising a vessel provided with terminal inlet and discharge zones for passage of said gas through said filter, said vessel having at least one abrupt increase in cross-sectional area between said terminal zones to provide an abrupt decrease in velocity of said gas while it is flowing through said filter, said inlet and discharge zones having cross-sectional areas in a ratio of from about 1:10 to about 1:150, and a continuous bed of a porous material having a substantially uniform density packed within said vessel to a density of from about 10 to about 100 pounds per cubic foot.

2. An improved filter for sterilizing air, comprising at least two containers connected in series with each other in order of increasing cross-sectional area to provide an abrupt decrease in velocity of said air while it is flowing through said filter, the terminal containers defining inlet and discharge zones respectively having cross-sectional areas in a ratio of from about 1:10 to about 1:150, and a continuous bed of a fibrous material packed within said interconnecting containers to a substantially uniform density of from about 10 to about 100 pounds per cubic foot.

3. An improved filter for sterilizing air, comprising at least two cylinders connected in series with each other in order of increasing diameter to provide an abrupt decrease in velocity of said air while it is flowing through said filter, the terminal cylinders defining inlet and discharge zones respectively having cross-sectional areas in a ratio of from about 1:10 to about 1:150, and a continuous bed of a fibrous material packed within said interconnecting cylinders to a substantially uniform density of from about 10 to about 100 pounds per cubic foot.

4. An improved filter for sterilizing air, comprising three interconnecting cylinders arranged in vertical tandem relation in order of increasing diameter to provide an abrupt decrease in velocity of said air while it is flowing through said filter, the terminal cylinders defining lowermost and uppermost zones provided with inlet and outlet openings respectively, said lowermost and uppermost zones having cross-sectional areas in a ratio of from about 1:15 to about 1:100, and a continuous bed of glass fibers packed within said interconnecting cylinders to a substantially uniform density of from about 10 to about 50 pounds per cubic foot.

5. An improved filter as set forth in claim 1 wherein said porous material comprises a bed of glass fibers having an average diameter of from about 5 to about 40 microns.

6. A method for sterilizing air which comprises directing a stream of said air through a vessel substantially completely filled by a porous medium at an initial linear velocity of from about one to fifteen feet per second and abruptly reducing said linear velocity at least once within said porous medium by abruptly increasing its cross-sectional area while it is flowing through said porous medium, and said abrupt increase in itself being sufficient to establish a velocity gradient of from about 0.9 to about 14.9 feet per second across the portion of said porous medium in which it is made.

References Cited in the file of this patent

UNITED STATES PATENTS

| | | |
|---|---|---|
| 967,212 | Lowe | Aug. 16, 1910 |
| 1,040,914 | Farmer | Oct. 8, 1912 |
| 1,328,088 | Lutz | Jan. 13, 1920 |
| 1,897,372 | Garner et al. | Feb. 14, 1933 |
| 1,963,874 | Stampe | June 19, 1934 |
| 2,210,059 | Broden | Aug. 6, 1940 |
| 2,630,878 | Hopper et al. | Mar. 10, 1953 |

FOREIGN PATENTS

| | | |
|---|---|---|
| 23,073 | Great Britain | 1899 |